(12) United States Patent
Watanabe et al.

(10) Patent No.: US 7,910,180 B2
(45) Date of Patent: Mar. 22, 2011

(54) LIQUID CRYSTAL AND LIQUID CRYSTAL DISPLAY

(75) Inventors: Junji Watanabe, Tokyo (JP); Tatsuya Izumi, Warabi (JP)

(73) Assignees: Tokyo Institute of Technology, Tokyo (JP); Lintec Corporation, Tokyo (JP)

( * ) Notice: Subject to any disclaimer, the term of this patent is extended or adjusted under 35 U.S.C. 154(b) by 592 days.

(21) Appl. No.: 11/990,081

(22) PCT Filed: May 9, 2006

(86) PCT No.: PCT/JP2006/309317
§ 371 (c)(1),
(2), (4) Date: Feb. 6, 2008

(87) PCT Pub. No.: WO2006/121040
PCT Pub. Date: Nov. 16, 2006

(65) Prior Publication Data
US 2010/0155663 A1 Jun. 24, 2010

(30) Foreign Application Priority Data
May 9, 2005 (JP) .................................. 2005-136476

(51) Int. Cl.
*C09K 19/52* (2006.01)
*C09K 19/20* (2006.01)
*C09K 19/12* (2006.01)

(52) U.S. Cl. ..................... 428/1.1; 428/1.3; 252/299.01; 252/299.5; 252/299.66; 252/299.67

(58) Field of Classification Search .................... 428/1.1, 428/1.3; 252/299.01, 299.62, 299.66, 299.67, 252/299.5
See application file for complete search history.

(56) References Cited

FOREIGN PATENT DOCUMENTS

| JP | 11256163 A | * | 9/1999 |
| JP | 2001303058 A | * | 10/2001 |
| JP | 2002161277 A | * | 6/2002 |

OTHER PUBLICATIONS

English translation by computer for JP 2002-161277, http://www4.ipdl.inpit.go.jp/Tokujitu/PAJdetail.ipdl?N0000=60&N0120=01&N2001=2&N3001=2002-161277.*

(Continued)

*Primary Examiner* — Shean C Wu
(74) *Attorney, Agent, or Firm* — Kratz, Quintos & Hanson, LLP

(57) ABSTRACT

A novel liquid crystal comprising a first liquid compound having bent structures and a second liquid crystal compound. A liquid crystal phase formed by the first liquid crystal compound exhibits ferroelectricity or antiferroelectricity while a liquid crystal phase formed by the second liquid crystal compound exhibits neither ferroelectricity nor antiferroelectricity. A smectic liquid crystal phase formed by the first liquid crystal compound has a tilted structure while a smectic liquid crystal phase formed by the second liquid crystal compound has no tilted structure. The first liquid crystal compound is represented by the following chemical formula (m=16) and the second liquid crystal compound is represented by the following chemical formula (m=4).

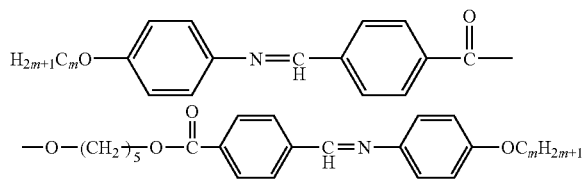

32 Claims, 5 Drawing Sheets

OTHER PUBLICATIONS

Watanabe etal.,"Smectic mesophase properties of dimeric compounds. 2. Distinct formation of smectic structures with antiferroelectric ordering and frustration", Molecular Crystals and Liquid Crystals Science and Technology, Section A: Molecular Crystals and Liquid Crystals (2000), 346, 77-86.*

English translation by computer for JP 2001-303058, http://www4.ipdl.inpit.go.jp/Tokujitu/PAJdetail.ipdl?N0000=60&N0120=01&N2001=2&N3001=2001-303058.*

English translation by computer for JP 11-256163, http://www4.ipdl.inpit.go.jp/Tokujitu/PAJdetail.ipdl?N0000=60&N0120=01&N2001=2&N3001=H11-256163.*

Pelzl et al., "Banana-Shaped Compounds—A New Field of Liquid Crystals", Adv. Mater. 1999, 11, No. 9.*

* cited by examiner

CONTENT OF THE FIRST LIQUID CRYSTAL COMPOUND (mol%)

LIQUID CRYSTAL AND LIQUID CRYSTAL DISPLAY

BACKGROUND OF THE INVENTION

1. Field of the Invention

The present invention relates to a novel liquid crystal. The invention further relates to a novel liquid crystal display using the liquid crystals.

2. Description of the Related Art

When an electric field is applied, a ferroelectric liquid crystal exhibits a response speed which is several tens to several hundreds of times faster than that of the nematic liquid crystal that has heretofore been used in the liquid crystal displays, and is, therefore, drawing attention as a material of a new display system and its study has now been continued.

The ferroelectric liquid was discovered by Meyer of the U.S.A. in 1976. This system was obtained by introducing asymmetric carbon atoms into a compound that expresses smectic C to realize a chiral smectic C-phase, lowering the symmetry of the system and exhibiting ferroelectricity.

In 1996, Niori et al. have discovered a compound that exhibits ferroelectricity without introducing asymmetric carbon atoms into the system. From its molecular shape, this compound is called banana-type liquid crystal or bent-type liquid crystal, and is very advantageous in the cost of production as compared to the conventional ferroelectric liquid crystals since it does not require a step of chiral division which is necessary for the asymmetric carbon-introduced systems. The banana-type liquid crystal makes it possible to fabricate a ferroelectric liquid crystal display more economically than using the conventional ferroelectric liquid crystals.

The banana-type liquid crystals of new structures and compositions have been developed (see, for example, JP-A-9-221456 (patent document 1), JP-A-11-256163 (patent document 2) and JP-A-2002-161277 (patent document 3)). A report has also been made concerning the phase structure of the banana-type liquid crystals (see, for example, J. Watanabe, T. Izumi, T. Niori, M. Zennyoji, Y. Takanishi, H. Takezoe, Mol. Cryst. Liq. Cryst. 346, 77, 2000 (non-patent document 1)).

In the ferroelectric smectic liquid crystal phase formed by the conventional banana-type liquid crystals, however, the molecules have a tilted structure being tilted relative to the direction of normal to the smectic liquid crystal layer, involving a problem in that three liquid crystal phases of (+) chiral, (−) chiral and racemic are mixed together depending upon the manner of tilting.

In fabricating a liquid crystal display (LCD), it is an essential requirement to uniformly arrange the liquid crystal molecules in the cells. With the three kinds of liquid crystal phases being mixed together as described above, however, it is difficult to uniformly arrange the liquid crystal molecules in the cells.

SUMMARY OF THE INVENTION

It has, therefore, been desired to develop a novel liquid crystal and a novel liquid crystal display that solve the above-mentioned problem.

The present invention was accomplished in view of the above problem and has an object of providing a novel liquid crystal.

The invention further has an object of providing a novel liquid crystal display using the liquid crystals.

In order to achieve the above objects while solving the above problem, the present invention provides a liquid crystal comprising a first liquid crystal compound having bent structures and another second liquid crystal compound.

Here, the liquid crystal phase formed by the first liquid crystal compound exhibits ferroelectricity or antiferroelectricity.

The liquid crystal phase formed by the second liquid crystal compound exhibits neither ferroelectricity nor antiferroelectricity.

The second liquid crystal compound having a bent structure can be used.

The first liquid crystal compound and the second liquid crystal compound have the same structure except the terminal chain lengths.

A smectic liquid crystal phase formed by the first liquid crystal compound has a tilted structure while a smectic liquid crystal phase formed by the second liquid crystal compound has no tilted structure.

The first liquid crystal compound is represented by the formula 1 (m=16) and the second liquid crystal compound is represented by the formula 1 (m=4).

The content of the first liquid crystal compound is in a range of 25 to 80 mol %.

Further, the first liquid crystal compound and the second liquid crystal compound are represented by the general formula,

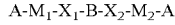

wherein A represents terminal chains, $M_1$ and $M_2$ are mesogenic groups, $X_1$ and $X_2$ are bonding groups, and B is a bent chain.

The mesogenic groups $M_1$ and $M_2$ as well as the bonding groups $X_1$ and $X_2$ are symmetrically arranged with the bent chain B as a center.

The bent chain B is represented by either $-(CH_2)_{2n-1}-$ (n is an integer) or $-(CH_2)_m-O-)_{2n-1}-(CH_2)_m-$ (m and n are integers), and the number of carbon atoms possessed by the bent chain B is in a range of 3 to 9.

The terminal chain A is a group of either $-O-(CH_2)_n CH_3$ (n is an integer) or $-(CH_2)_n CH_3$ (n is an integer), the number of carbon atoms possessed by the terminal chain A of the first liquid crystal compound is in a range of 12 to 20, and the number of carbon atoms possessed by the terminal chain A of the second liquid crystal compound is in a range of 1 to 7.

The mesogenic groups $M_1$ and $M_2$ are the groups of at least one kind selected from the group consisting of those of the formula 2.

The bonding group $X_1$ is $-COO-$ and the bonding group $X_2$ is $-OCO-$.

Further, the first liquid crystal compound and the second liquid crystal compound are represented by the general formula,

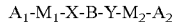

wherein $A_1$ and $A_2$ are terminal chains, $M_1$ and $M_2$ are mesogenic groups, X and Y are bonding groups of $-COO-$ or $-OCO-$ independently of each other, and B is an aromatic compound group.

The terminal chains $A_1$ and $A_2$ are groups of at least one kind selected from the group consisting of $-O(CH_2)_{n-1}CH_3$ (n is an integer), $-(CH_2)_{n-1}CH_3$ (n is an integer), $-O(CH_2CH_2O)_n CH_3$ (n is an integer), and $-O(CH_2CH_2CH_2O)_n CH_3$ (n is an integer), the number of carbon atoms possessed by the terminal chains $A_1$ and $A_2$ of the first liquid crystal compound is in a range of 12 to 20, and the number of carbon atoms possessed by the terminal chains $A_1$ and $A_2$ of the second liquid crystal compound is in a range of 1 to 7.

The mesogenic groups $M_1$ and $M_2$ are the groups of at least one kind selected from the group consisting of those of the formula 3.

The aromatic compound group B is a group of at least one kind selected from the group consisting of those of the formula 4.

A liquid crystal display of the present invention uses liquid crystals comprising a first liquid crystal compound having bent structures and another second liquid crystal compound.

Here, the liquid crystal phase formed by the first liquid crystal compound exhibits ferroelectricity or antiferroelectricity.

The liquid crystal phase formed by the second liquid crystal compound exhibit neither ferroelectricity nor antiferroelectricity.

The second liquid crystal compound having a bent structure can be used.

The first liquid crystal compound and the second liquid crystal compound have the same structure except the terminal chain lengths.

A smectic liquid crystal phase formed by the first liquid crystal compound has a tilted structure while a smectic liquid crystal phase formed by the second liquid crystal compound has no tilted structure.

The first liquid crystal compound is represented by the formula 1 (m=16) and the second liquid crystal compound is represented by the formula 1 (m=4).

The content of the first liquid crystal compound is in a range of 25 to 80 mol %.

Further, the first liquid crystal compound and the second liquid crystal compound are represented by the general formula,

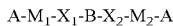

wherein A represents terminal chains, $M_1$ and $M_2$ are mesogenic groups, $X_1$ and $X_2$ are bonding groups, and B is bent chain.

The mesogenic groups $M_1$ and $M_2$ as well as the bonding groups $X_1$ and $X_2$ are symmetrically arranged with the bent chain B as a center.

The bent chain B is represented by either —$(CH_2)_{2n-1}$— (n is an integer) or —$(CH_2)_m$O—$)_{2n-1}$—$(CH_2)_m$— (m and n are integers), and the number of carbon atoms possessed by the bent chain B is in a range of 3 to 9.

The terminal chain A is a group of either —O—$(CH_2)_n CH_3$ (n is an integer) or —$(CH_2)_n CH_3$ (n is an integer), the number of carbon atoms possessed by the terminal chain A of the first liquid crystal compound is in a range of 12 to 20, and the number of carbon atoms possessed by the terminal chain A of the second liquid crystal compound is in a range of 1 to 7.

The mesogenic groups $M_1$ and $M_2$ are the groups of at least one kind selected from the group consisting of those of the formula 2.

The bonding group $X_1$ is —COO— and the bonding group $X_2$ is —OCO—.

Further, the first liquid crystal compound and the second liquid crystal compound are represented by the general formula,

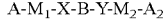

wherein $A_1$ and $A_2$ are terminal chains, $M_1$ and $M_2$ are mesogenic groups, X and Y are bonding groups of —COO— or —OCO— independently of each other, and B is an aromatic compound group.

The terminal chains $A_1$ and $A_2$ are groups of at least one kind selected from the group consisting of —O$(CH_2)_{n-1}CH_3$ (n is an integer), —$(CH_2)_{n-1}CH_3$ (n is an integer), —O$(CH_2CH_2O)CH_3$ (n is an integer) and —O$(CH_2CH_2CH_2O)_n CH_3$ (n is an integer), the number of carbon atoms possessed by the terminal chains $A_1$ and $A_2$ of the first liquid crystal compound is in a range of 12 to 20, and the number of carbon atoms possessed by the terminal chains $A_1$ and $A_2$ of the second liquid crystal compound is in a range of 1 to 7.

The mesogenic groups $M_1$ and $M_2$ are the groups of at least one kind selected from the group consisting of those of the formula 3.

The aromatic compound group B is a group of at least one kind selected from the group consisting of those of the formula 4.

The present invention exhibits effects as described below.

That is, the invention provides a novel liquid crystal comprising a first liquid crystal compound having bent structures and another second liquid crystal compound.

The invention further provides a novel liquid crystal display using liquid crystals comprising the first liquid crystal compound having bent structures and the another second liquid crystal compound.

DESCRIPTION OF THE PREFERRED EMBODIMENTS

Figure 1:
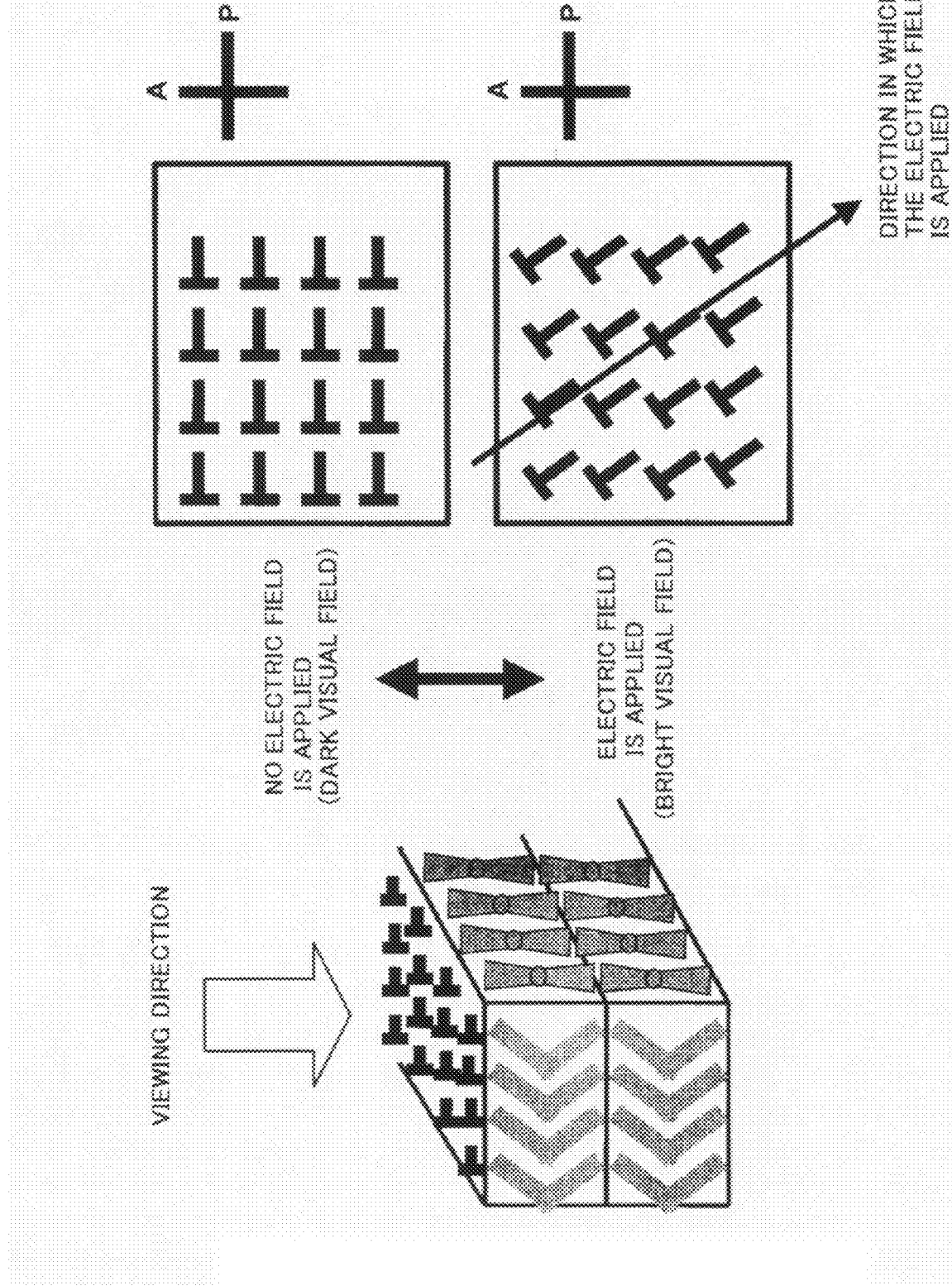
FIG. 1 is a view illustrating a liquid crystal display of the present invention.

Preferred embodiments of the invention will now be described.

First, described below is a preferred embodiment of a liquid crystal according to the present invention.

The liquid crystal of the invention comprises a first liquid crystal compound having bent structures and another second liquid crystal compound.

The first liquid crystal compound has the bent structure. The liquid crystal having the bent structure is called banana-type liquid crystal or the bent-type liquid crystal, and comprises molecules of a bent structure.

A liquid crystal phase formed by the first liquid crystal compound exhibits ferroelectricity or antiferroelectricity. The ferroelectric liquid crystals are liquid crystals in which the molecules have spontaneous polarizations, the direction of spontaneous polarizations is oriented in one direction in the whole liquid crystal phase, and when an electric field is applied, the direction of spontaneous orientations is oriented in a direction in which the electric field is applied. The antiferroelectric liquid crystals are liquid crystals in which the molecules have spontaneous polarizations, the direction of spontaneous polarizations is oriented in the same layer but the direction of spontaneous polarizations is opposite relative to the adjacent layer, the spontaneous polarizations are cancelled in the whole liquid crystal phase, but when an electric field is applied, the direction of spontaneous polarizations is oriented in a direction in which the electric field is applied. The (anti)ferroelectric liquid crystal responds to the electric field several tens to several hundreds of times as quickly as compared to the ordinary liquid crystals (paraelectric crystals), and is very advantageous for changing over the image when it is used as a display device.

The smectic liquid crystal phase formed by the first liquid crystal compound has a tilted structure. The smectic liquid crystal phase is a liquid crystal phase having a layer structure using liquid crystals of one species. The tilted structure is a (tilted) structure in which the molecules are tilted relative to the normal to the layer in the smectic liquid crystal phase.

The second liquid crystal compound having a bent structure can be used. The liquid crystal phase formed by the second liquid crystal compound exhibits neither the ferroelectricity nor the antiferroelectricity. The first liquid crystal compound and the second liquid crystal compound have the same structure except the terminal chain lengths. The smectic liquid crystal phase formed by the second liquid crystal compound has no tilted structure.

Concrete examples of the first liquid crystal compound and the second liquid crystal compound will now be described.

As the first liquid crystal compound and the second liquid crystal compound, there can be exemplified those having the structure of the formula 1. Here, the first liquid crystal compound has m=16 while the second liquid crystal compound has m=4.

liquid crystal phase. This effect becomes more conspicuous if the number of carbon atoms is not larger than 7.

The terminal chain A is a group of either —O—$(CH_2)_n CH_3$ (n is an integer) or —$(CH_2)_n CH_3$ (n is an integer).

It is desired that the number of carbon atoms possessed by the terminal chain A of the first liquid crystal compound is in a range of 12 to 20. It is further desired the number of carbon atoms possessed by the terminal chain A of the first liquid crystal compound is in a range of 12 to 18.

If the number of carbon atoms is not smaller than 12, the bent chain B and the terminal chain A become little compatible with each other easily forming a smectic liquid crystal phase in which the bent chain B and the terminal chain A are separated by a micro-phase offering, as a result, an advantage of forming ferroelectric liquid crystals or antiferroelectric liquid crystals.

If the number of carbon atoms is not larger than 20, the smectic liquid crystal phase is easily formed in which the bent chain B and the terminal chain A are separated by a micro-phase offering, as a result, an advantage of forming ferroelectric liquid crystals or antiferroelectric liquid crystals. If the number of carbon atoms is not larger than 18, the effect becomes more conspicuous.

It is desired that the number of carbon atoms possessed by the terminal chain A of the second liquid crystal compound is in a range of 1 to 7. It is further desired that the number of carbon atoms possessed by the terminal chain A of the second liquid crystal compound is in a range of 4 to 6.

If the number of carbon atoms is not smaller than 1, an advantage is obtained in that the compound easily forms smectic liquid crystals. The effect becomes more conspicuous if the number of carbon atoms is not smaller than 4.

formula 1

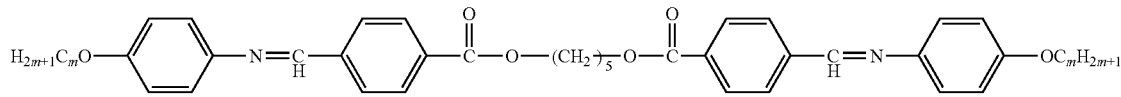

As the first liquid crystal compound and the second liquid crystal compound, there can be exemplified the liquid crystals represented by the following general formula,

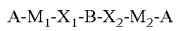

wherein A represents terminal chains, $M_1$ and $M_2$ are mesogenic groups, $X_i$ and $X_2$ are bonding groups, and B is a bent chain.

The mesogenic groups $M_1$ and $M_2$ as well as the bonding groups $X_1$ and $X_2$ are symmetrically arranged with the bent chain B as a center.

The bent chain B is represented by either —$(CH_2)_{2n-1}$— (n is an integer) or —$(CH_2)_m$—O—$)_{2n-1}$—$(CH_2)_m$— (m and n are integers).

It is desired that the number of carbon atoms possessed by the bent chain B is in a range of 3 to 9. It is further desired that the number of carbon atoms possessed by the bent chain B is in a range of 5 to 7.

If the number of carbon atoms is not smaller than 3, an advantage is obtained in that the compound easily forms a liquid crystal phase. This effect becomes more conspicuous if the number of carbon atoms is not smaller than 5.

If the number of carbon atoms is not larger than 9, an advantage is obtained in that the compound easily forms a If the number of carbon atoms is not larger than 7, an advantage is obtained in that the smectic phase is easily formed in which the bent chain B and the terminal chain A are compatible with each other in a random fashion. The effect becomes more conspicuous if the number of carbon atoms is not larger than 6.

The mesogenic groups $M_1$ and $M_2$ are the groups of at least one kind selected from the group consisting of those of the formula 2, Formula 2

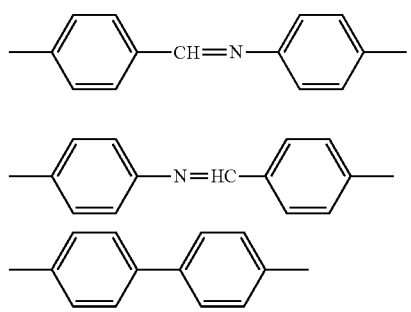

-continued

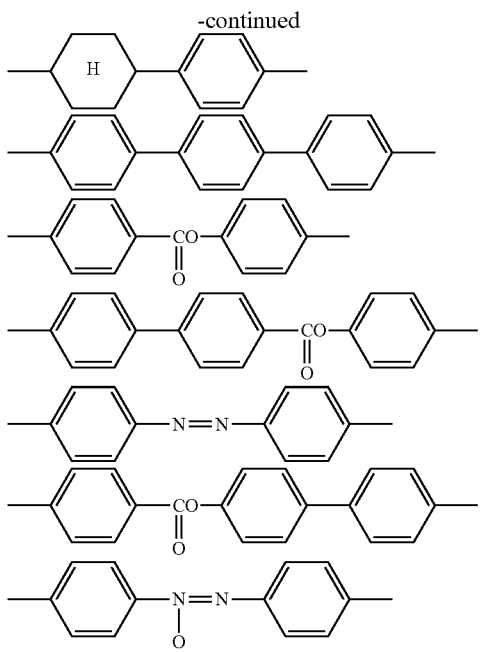

The skeletons of these mesogenic groups may be partly substituted with such a substituent as cyano group, halogen group, methoxy group or methyl group.

The bonding group $X_1$ is —COO— and the bonding group $X_2$ is —OCO—.

As the first liquid crystal compound and the second liquid crystal compound, there can be exemplified the liquid crystals represented by the following general formula,

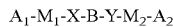

$$A_1\text{-}M_1\text{-}X\text{-}B\text{-}Y\text{-}M_2\text{-}A_2$$

wherein $A_1$ and $A_2$ are terminal chains, $M_1$ and $M_2$ are mesogenic groups, X and Y are bonding groups of —COO— or —OCO— independently of each other, and B is an aromatic compound group.

The terminal chains $A_1$ and $A_2$ are groups of at least one kind selected from the group consisting of —O(CH$_2$)$_{n-1}$CH$_3$ (n is an integer), —(CH$_2$)$_{n-1}$CH$_3$ (n is an integer), —O(CH$_2$CH$_2$O)$_n$CH$_3$ (n is an integer) and —O(CH$_2$CH$_2$CH$_2$O)$_n$CH$_3$ (n is an integer).

It is desired that the number of carbon atoms possessed by the terminal chains $A_1$ and $A_2$ of the first liquid crystal compound is in a range of 12 to 20. It is further desired that the number of carbon atoms possessed by the terminal chains $A_1$ and $A_2$ of the first liquid crystal compound is in a range of 12 to 18.

If the number of carbon atoms is not smaller than 12, the central aromatic compound group B and the terminal chain A become little compatible with each other easily forming a smectic liquid crystal phase in which the bent chain B and the terminal chain A are separated by a micro-phase offering, as a result, an advantage of forming ferroelectric liquid crystals or antiferroelectric liquid crystals.

If the number of carbon atoms is not larger than 20, the smectic liquid crystal phase is easily formed in which the central aromatic compound group B and the terminal chain A are separated by a micro-phase offering, as a result, an advantage of forming ferroelectric liquid crystals or antiferroelectric liquid crystals. If the number of carbon atoms is not larger than 18, the effect becomes more conspicuous.

It is desired that the number of carbon atoms possessed by the terminal chains $A_1$ and $A_2$ of the second liquid crystal compound is in a range of 1 to 7. It is further desired that the number of carbon atoms possessed by the terminal chains $A_1$ and $A_2$ of the second liquid crystal compound is in a range of 4 to 6.

If the number of carbon atoms is not smaller than 1, an advantage is obtained in that the compound easily forms the smectic liquid phase. The effect becomes more conspicuous if the number of carbon atoms is not smaller than 4.

If the number of carbon atoms is not larger than 7, an advantage is obtained in that the smectic phase is easily formed in which the central aromatic compound group B and the terminal chain A are compatible with each other in a random fashion. The effect becomes more conspicuous if the number of carbon atoms is not larger than 6.

The mesogenic groups $M_1$ and $M_2$ are the groups of at least one kind selected from the group consisting of those of the formula 3, Formula 3

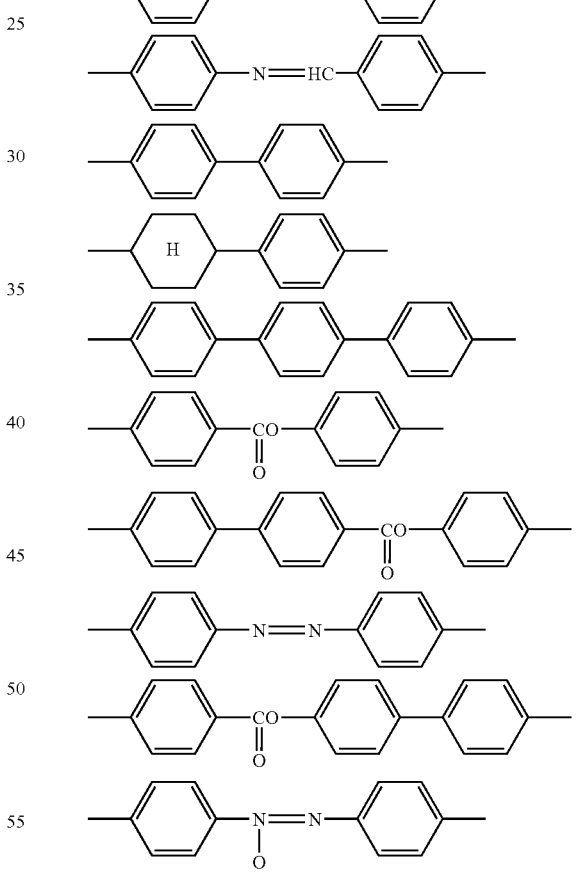

The skeletons of these mesogenic groups may be partly substituted with such a substituent as cyano group, halogen group, methoxy group or methyl group.

The aromatic compound group B is a group of at least one kind selected from the group consisting of those of the formula 4. The skeleton of the aromatic compound group B may be partly substituted with such a substituent as cyano group, halogen group, methoxy group or methyl group.

Formula 4
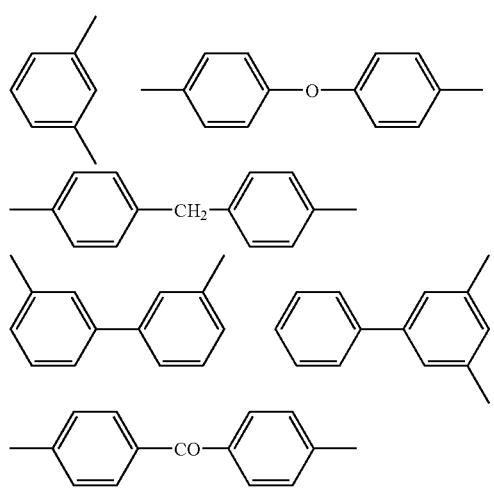
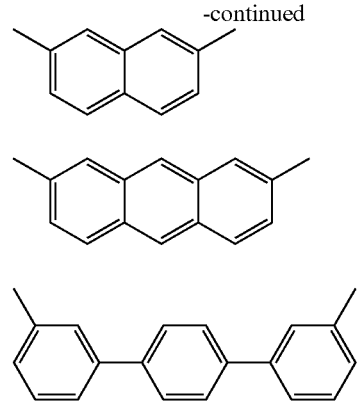
Concrete examples of the compounds having the above $A_1$, $A_2$, $M_1$, $M_2$ and B are those compounds represented by the formulas 5 to 8,
Formula 5
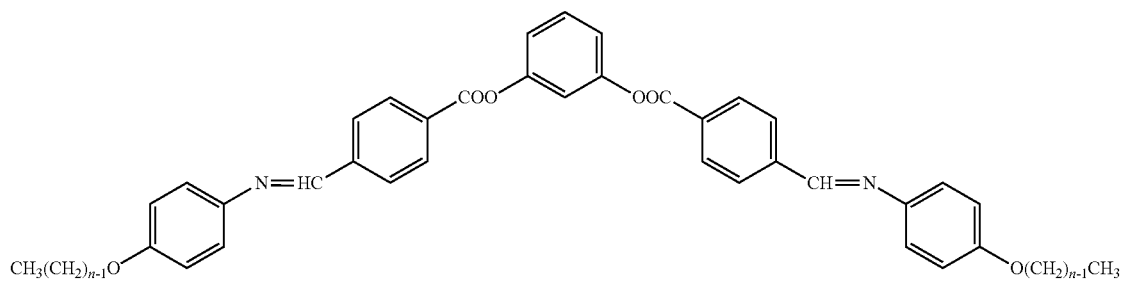
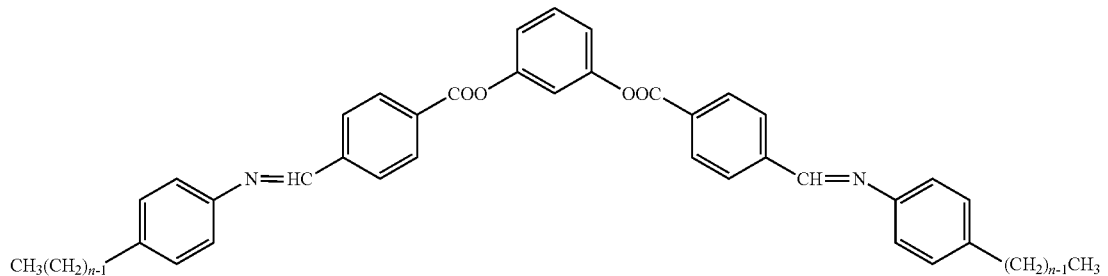
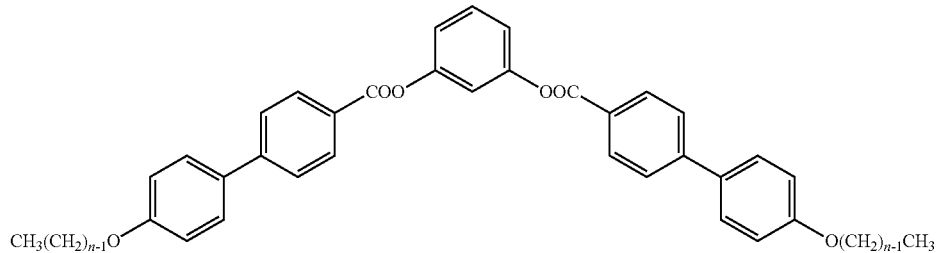
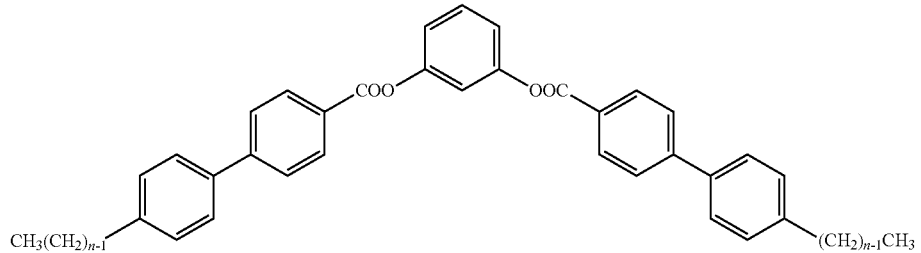

Formula 6
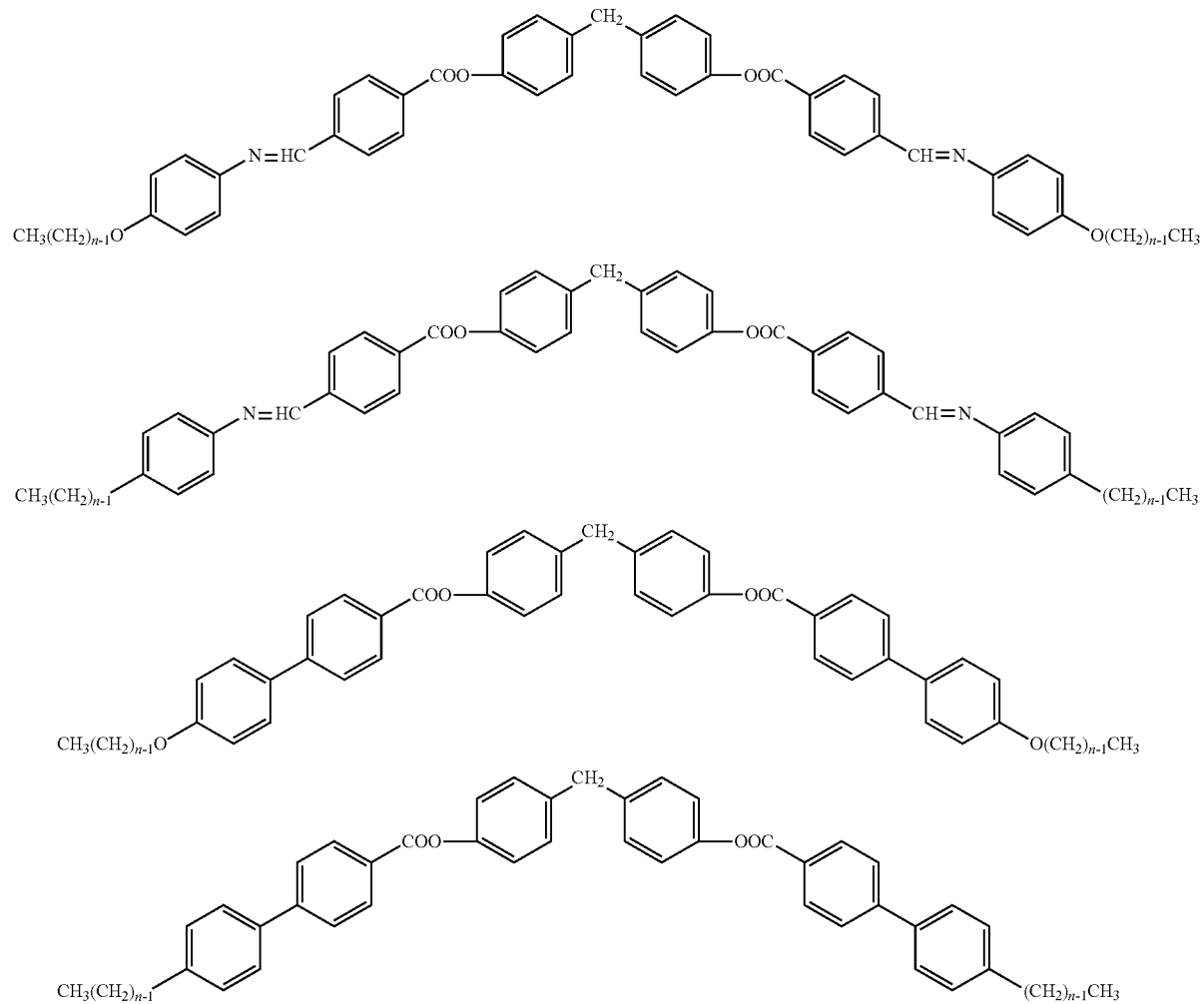
Formula 7
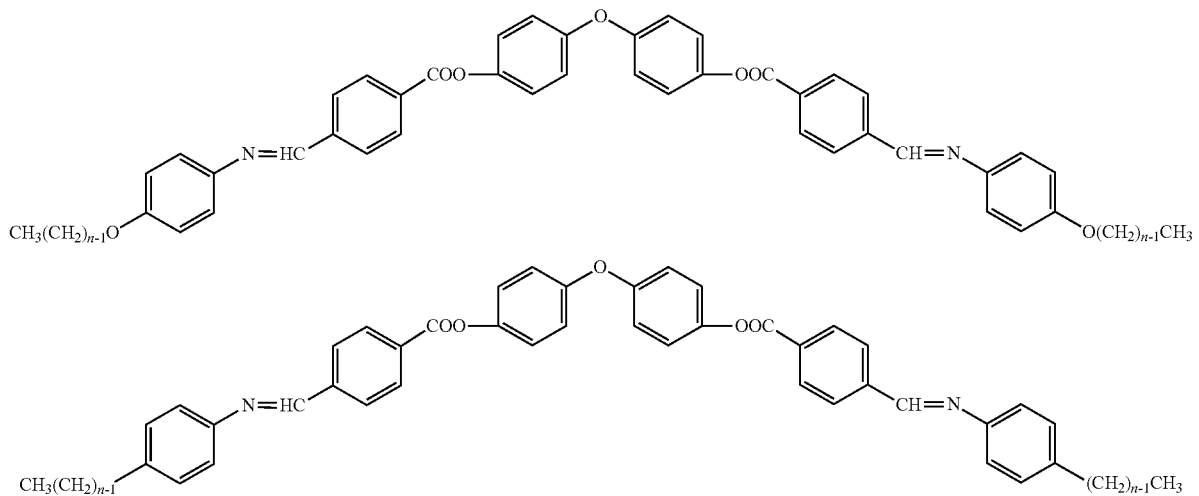

-continued
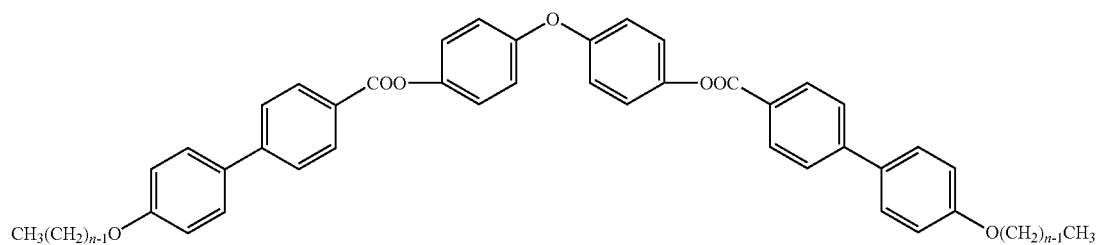
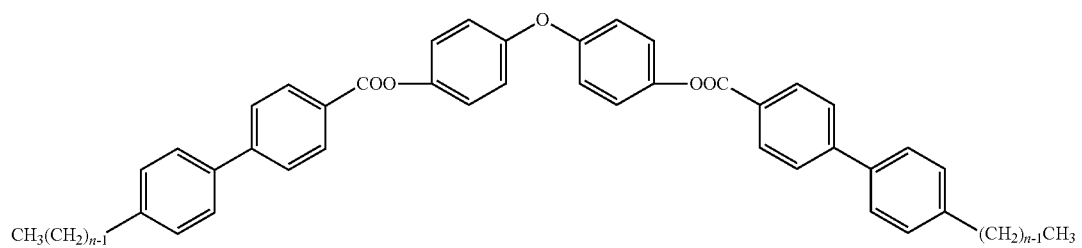
Formula 8
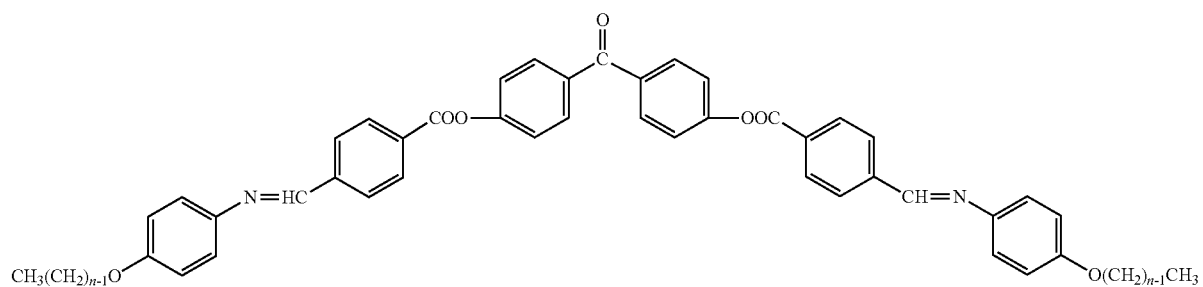
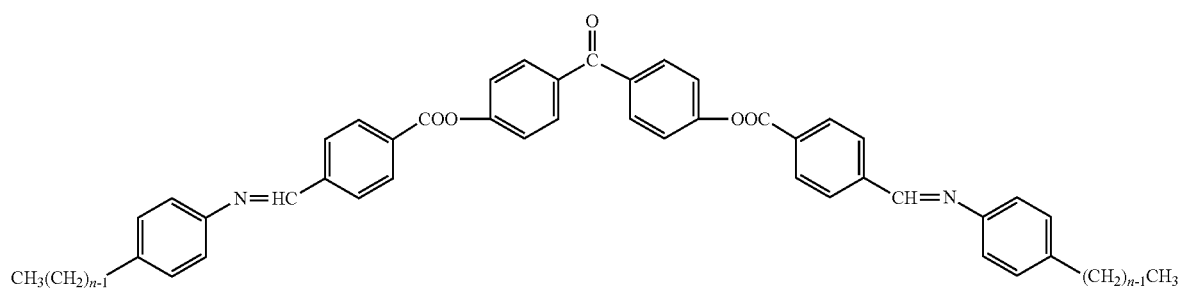
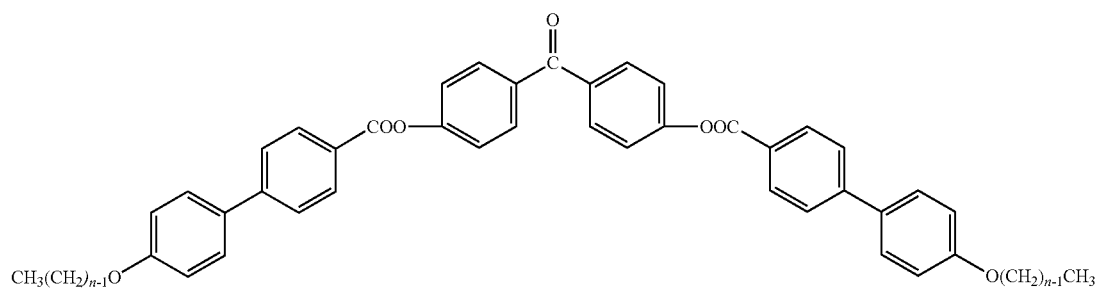

-continued

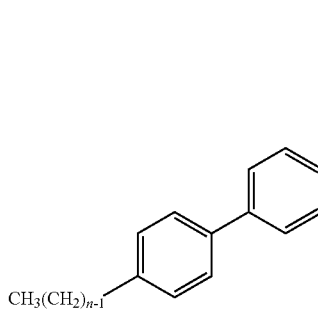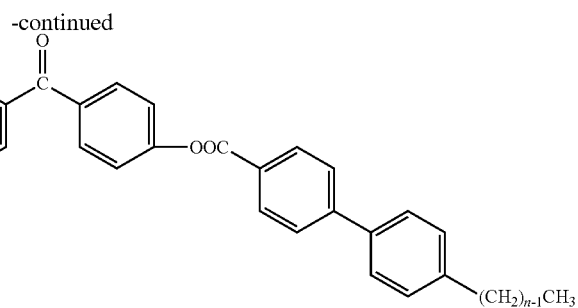

It is desired that content of the first liquid crystal compound is in a range of 20 to 85 mol %. It is further desired that content of the first liquid crystal compound is in a range of 25 to 80 mol %.

If the content is not smaller than 20 mol %, the smectic liquid crystal phase is easily formed in which the bent chain B and the terminal chain A are separated by a micro-phase offering, as a result, an advantage of forming ferroelectric liquid crystals or antiferroelectric liquid crystals. The effect becomes more conspicuous if the content is not smaller than 25 mol %.

If the content is not larger than 85 mol %, an advantage is offered in that the tilted structure extinguishes in the smectic liquid crystal phase that is formed. The effect becomes more conspicuous if the content is not larger than 80 mol %.

Thus, upon blending the liquid crystals having the bent structure forming a liquid crystal phase in which the molecules are tilted relative to the direction of the normal to the smectic liquid crystal layer and exhibiting ferroelectricity or antiferroelectricity with the liquid crystals having the bent structure in which the molecules are not tilted relative to the direction of the normal to the smectic liquid crystal layer and without exhibiting ferroelectricity or antiferroelectricity, it is made possible to produce ferroelectric liquid crystals and antiferroelectric liquid crystals having structures in which the molecules are not tilted relative to the direction of the normal to the smectic layer depending upon the blending ratio. Upon being blended with the compound that forms the liquid crystals without the tilted structure, it is allowed to form the liquid crystals of the one kind only from the three kinds of mixtures.

As described above, the preferred embodiment of the invention provides a novel liquid crystal comprising a first liquid crystal compound having bent structures and another second liquid crystal compound.

It should be noted that the present invention is not limited to the above preferred embodiment only but can assume various other constitutions without departing from the gist of the invention, as a matter of course.

Described next is a preferred embodiment of a liquid crystal display of the present invention.

The liquid crystal of the present invention can be used for the liquid crystal display. The liquid crystal display that is used will be, particularly, a ferroelectric liquid crystal display or an antiferroelectric liquid crystal display of the in-plane switching (IPS) mode.

In the in-plane switching (IPS) mode display, the LCD (TN mode) of the conventional type is holding the liquid crystal molecules between the two pieces of electrodes while in the IPS, two electrodes are placed on one side of the substrate. When no voltage is applied, the liquid crystal molecules are not twisted unlike those of the TN mode. However, if a voltage is applied to the electrodes in parallel with the glass substrate, the liquid crystal molecules are arranged so as to become horizontal with respect to the glass substrate. As a result, the liquid crystal molecules are horizontally arranged on the glass substrate eliminating a problem of narrow visual field angle. A problem, however, remains in that the response speed becomes slow. However, the present invention uses ferroelectric liquid crystals or antiferroelectric liquid crystals as the liquid crystal material making it possible to improve the response speed.

FIG. 1 is a view of a liquid crystal display of the present invention. The liquid crystal display uses the liquid crystals comprising the first liquid crystal compound and the second liquid crystal compound having bent structures.

When used as the liquid crystal display, the liquid crystal display is viewed from the upper side of the drawing (from the homeotropic direction) as shown on the left side in the drawing. In the liquid crystal display, the cells containing liquid crystal molecules are used being held between two pieces of polarizers. The screen of the display becomes a dark field when the direction of the liquid crystal molecules becomes in agreement with the direction (P- or A-direction) of the two pieces of polarizers, and becomes a bright field when they are not in agreement.

When no electric field is applied, the molecules are arranged to be in agreement with the direction of the polarizers as shown on the right side in the drawing. Thus, a normally dark field (normally black) is realized. The brightest field is obtained when the molecules are tilted by 45° relative to the direction of the polarizers. Therefore, the direction of applying the electric field is tilted by 45° relative to the polarizers. Since the molecules are arranged in a direction in which the electric field is applied, the display becomes the brightest when the electric field is applied in a direction tilted by 45° relative to the polarizers and the highest contrast is obtained.

As described above, the preferred embodiment of the invention provides a novel liquid crystal display by using the liquid crystals comprising the first liquid crystal compound having bent structures and the another second liquid crystal compound.

Here, it should be noted that the present invention is not limited to the above preferred embodiment only but can assume various other constitutions without departing from the gist of the invention, as a matter of course.

EXAMPLES

Examples of the present invention will now be concretely described. Here, however, the invention is in no way limited to these Examples only, as a matter of course.

Described below is a relationship between the number of carbon atoms at the terminal chains and the phase structure concerning a compound having a bent structure represented by the formula 9, Formula 9

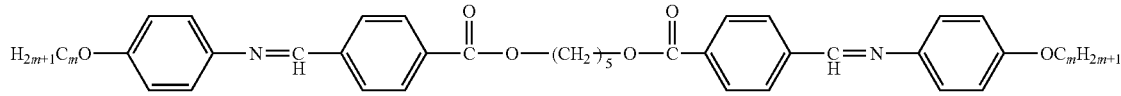

Figure 2:
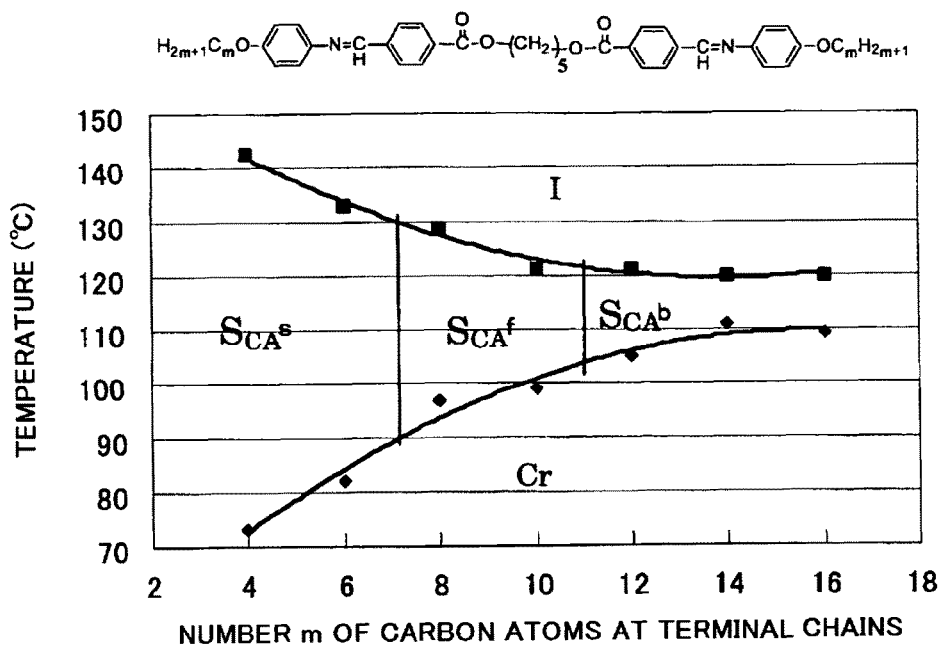
FIG. 2 is a diagram illustrating a relationship between the number of carbon atoms at the terminal chains and the phase structure concerning a compound having a bent structure.
Figure 3:
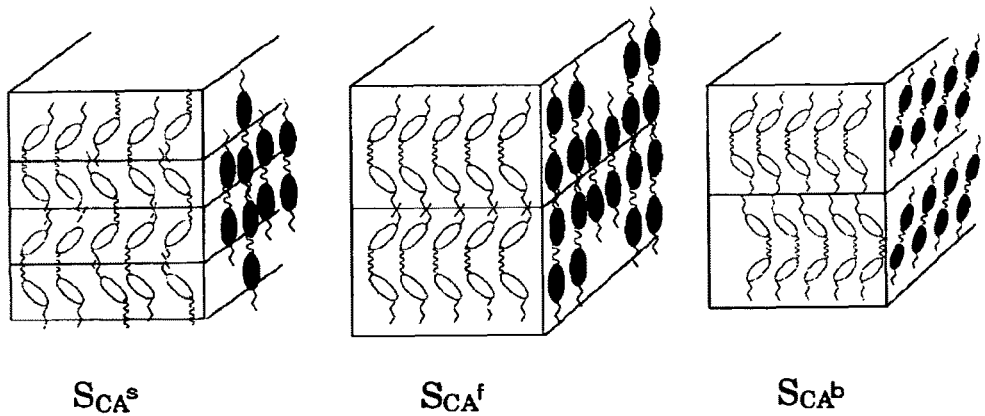
FIG. 3 is a view illustrating $S_{CA}^{\ s}$-, $S_{CA}^{\ f}$- and $S_{CA}^{\ b}$-phase structures.

FIG. 2 is a diagram illustrating a relationship between the number of carbon atoms at the terminal chains and the phase structure concerning the compound having the bent structure (non-patent document 1). FIG. 3 is a view illustrating $S_{CA}{}^s$-, $S_{CA}{}^f$- and $S_{CA}{}^b$-phase structures.

The compound represented by the formula 9 has a structure in which two mesogenic groups forming a liquid crystal in a molecule are linked together through a bent chain. In the normal liquid crystal phase, the mesogenic groups are, usually, all oriented in the same direction. When the two mesogenic groups are linked through an alkyl chain or the like, however, the liquid crystal structure that is formed is strongly affected by the alkyl chain that is linking. The alkyl chain that is linking, usually, assumes an all-trans structure. In this case, if the linking alkyl chain has carbon atoms in an odd number, the two mesogenic groups are tilted in the opposite directions and if the linking alkyl chain has carbon atoms in an even number, the two mesogenic groups are arranged in parallel. In the case of the formula 9, the bent chain has 5 carbon atoms and, therefore, a liquid crystal is formed in which the two mesogenic groups are not allowed to be directed in the same direction but are directed in the opposite relations relative to each other. This smectic liquid crystal is called $S_{CA}$. When the smectic liquid crystal is formed by the compound in which the bent chain has an odd number of carbon atoms as represented by the formula 9, the $S_{CA}$ structure is basically formed irrespective of the length of the terminal chains.

Next, described below is a difference in the liquid crystal structure that is expressed depending upon the terminal chain length. As described above, the compound represented by the formula 9 has two mesogenic groups that form a liquid crystal in a molecule. When this molecule forms the smectic liquid crystal phase, a smectic layer tends to be formed in which the mesogens are arranged maintaining an equal gap. When a difference is small between the bent chain and the terminal chain or, concretely, in the case of a compound in which the number of carbon atoms of the terminal chain is 4 or 6 relative to the number of carbon atoms of the bent chain of 5, a layer is formed in which the mesogens are arranged maintaining an equal gap. Therefore, there is formed an $S_{CA}$-phase in which the bent chain and the terminal chain are compatible with each other in a random fashion.

In this structure, each mesogen is forming a layer which is called single-layer smectic layer and is expressed as $S_{CA}{}^s$ by taking s of the single layer. The smectic layer gap in $S_{CA}{}^s$ is about one-half the molecular length. The layer gap of a compound having 4 and 6 carbon atoms at the terminal chains is measured by an X-ray diffraction method to be nearly one-half the calculated molecular length, from which it is learned that the molecules are not tilted relative to the direction of the normal to the smectic layer. In the $S_{CA}{}^s$ the dipole moments of mesogens are arranged in a random fashion. Therefore, the dipole moments are cancelled in the layer expressing neither ferroelectricity nor antiferroelectricity.

Conversely, when the bent chain length and the terminal chain length are very different from each other or, concretely, when the bent chain has 5 carbon atoms whereas the terminal chain has not less than 12 carbon atoms, the bent chain and the terminal chain become no longer compatible with each other in a random fashion, and an $S_{CA}$-phase is formed in which they are separated by a micro-layer. This occurs since the force by which the mesogens are arranged maintaining an equal gap is exceeded by the force by which the bent chain and the terminal chain are separated by a micro-phase. In this liquid crystal phase, a layer is formed by two mesogens and is called bilayer smectic phase which is expressed as $S_{CA}{}^b$ by taking b of bilayer. The smectic layer gap in $S_{CA}{}^b$ is nearly equal to the molecular length. Measurement by the X-ray diffraction method, however, indicates that the smectic layer gap is slightly shorter than the calculated molecular length, suggesting the tilted structure in which the molecules are tilted relative to the normal to the smectic layer. In the $S_{CA}{}^b$, the mesogens are all directed in the same direction in the same layer. Therefore, dipole moments of the mesogens are not cancelled in the layers; i.e., the layers have a strong dipole moment (also called spontaneous polarization). The liquid crystals are called ferroelectric liquid crystals when the spontaneous polarizations therein are all oriented in the same direction in the liquid crystal phase and when the molecules can be oriented by the application of an electric field in a direction in which the electric field is applied. The liquid crystals are called antiferroelectric liquid crystals when the spontaneous polarizations are oriented in the same direction in each other but are oriented in the opposite directions between the adjacent layers and are cancelled in the system as a whole and when the directions of molecules can be changed by the application of an electric field in a direction in which the electric field is applied like the ferroelectric liquid crystals. Upon measuring the polarization inversion current, it is confirmed that $S_{CA}{}^b$ is an antiferroelectric liquid crystal. Further, the molecules are tilted in the direction of the normal to the smectic layer, and three kinds of liquid crystal species, i.e., (+) chiral, (−) chiral and racemic are mixed together depending upon the direction of tilting thereof.

In an intermediate region between a range (numbers of carbon atoms at terminal chains are 4 and 6) forming $S_{CA}{}^s$ and a range (carbon atom numbers are 12, 14, 16) forming $S_{CA}{}^b$, a smectic liquid crystal called $S_{CA}{}^f$ is formed. The structure of $S_{CA}{}^f$ is as shown at the center in FIG. 3. Basically, this is a two-dimensional structure forming a bilayer structure and, further, having a structure in which several molecules are constituting a unit, each unit being deviated by a half period. Upon being deviated by the half period, the spontaneous polarizations generated in one unit can be cancelled by the adjacent unit. That is, the two-dimensional structure of $S_{CA}{}^f$ is the structure for canceling the spontaneous polarizations in the system as a whole which is of a form different from the antiferroelectric structure of $S_{CA}{}^b$ and is a spontaneous polarization dispersion (frustration) structure. Therefore, this liquid crystal is called $S_{CA}{}^f$ by taking f of frustration. Unlike $S_{CA}{}^b$, $S_{CA}{}^f$ exhibits neither ferroelectricity nor antiferroelectricity. This is presumably due to that in order to orient all of the dipole moments of molecules in the direction in which the electric field is applied, the frustration structure must be destroyed, i.e., the liquid crystal structure must be destroyed.

In fact, measurement of the polarization inversion current of $S_{CA}{}^f$ proves that the liquid crystal molecules form a two-dimensional lattice upon the application of an electric field or are oriented in the direction in which the electric field is applied for each of the blocks, which, however, stems from the dielectric anisotropy of paraelectric liquid crystals, and the response speed is very slow.

Described below is a method of preparing samples.

Liquid crystal compounds of the formula 9 were used as the first liquid crystal compound and the second liquid crystal compound. Here, the first liquid crystal compound had m=16 and the second liquid crystal compound had m=4.

Described below is a method of preparing mixed samples. The first liquid crystal compound and the second liquid crystal compound were compounded at predetermined mol ratios between the screws, the mixture thereof was dissolved in chloroform, and mixed solution was sufficiently stirred. The mixed solution was left to stand in an oven at 50° C. to vaporize chloroform to thereby obtain a mixed sample. Liquid crystals were prepared by setting the mol numbers of the first liquid crystal compound to be 0 mol %, 25.1 mol %, 49.8 mol %, 68.1 mol %, 80 mol %, 90 mol % and 100 mol % per the total mol number of the first liquid crystal compound and the second liquid crystal compound.

Described below are the method of evaluating the thus prepared liquid crystals and the evaluated results.

Observation Through a Polarizing Microscope (Observation of a Liquid Crystal Texture).

A polarizing microscope (BX50, manufactured by Olympus Co.) was used. A sample held between a slide glass and a cover glass was set in a hot stage (FP-90, manufactured by Mettler Co.), and was set on a rotary stage between the polarizer and the analyser of which the transmission easy axes are at right angles of the microscope. The texture of the sample was observed while changing the temperature in the hot stage to roughly make sure the kind of the liquid crystal phase and the phase transition temperature. Concretely, the phase transition temperature was found relying on a peak temperature measured by using a DSC (differential scanning calorimeter). The detailed liquid crystal structure was determined based on the X-ray diffraction measurement and the observation through the polarizing microscope when an electric field was applied.

Measurement of Differential Scanning Calorific Value.

A concrete phase transition temperature was measured by measuring the differential scanning calorific value. The differential scanning calorific value was measured by pouring 3 to 5 mg of a sample into a metal pan for measuring the differential scanning calorific value, using a metal pan containing no sample as a reference, elevating/lowering their temperatures at a rate of 10° C. per minute, and measuring the calorific values required for elevating/lowering the samples. A peak-top temperature of exothermic peak stemming from the isotropic phase—liquid crystal phase transition or the liquid crystal phase—crystal phase transition of the sample in the step of lowering the temperature, was regarded to be a transition temperature in the transition of the sample. The measured results were as shown in the column of phase transition behavior of Table 1. The phase transition behavior describes peak temperatures observed in the DSC measurement.

X-Ray Measurement (Determining the Structure of the Formed Liquid Crystals).

An X-ray apparatus (RINT 200, manufactured by Rigaku Co.) was used. The liquid crystal structure was determined by using an oriented sample, and the layer gap was determined by using a non-oriented sample with silicon as a reference.

The two samples were measured by being put into the hot stage (FP-90, manufactured by Mettler Co.), i.e., were determined for their ordered structures formed in the liquid phase and were measured for their periodical lengths of the ordered structures.

The oriented sample was prepared as described below. An octadecyltrimethoxysilane was added with stirring into an aqueous solution containing 95 mass % of ethanol of which the pH has been adjusted with acetic acid to be 4.5 to 5.5, such that the final concentration thereof was 2 mass %. Thereafter, the mixture was held for 5 minutes for effecting the hydrolysis and for forming silanol. In this solution was immersed a slide glass that has been thinly cut to be about 1 mm to about 1.5 mm and has been washed with ultrasonic waves in acetone. The slide glass was held therein for about 10 minutes. The glass after taken out was lightly washed with ethanol. Thereafter, the glass was left to stand in an oven at about 110° C. for 30 minutes to conduct the etherification reaction of an —OH group with a trimethoxyoctadecylsilane on the surface of the glass. The operation was repeated 2 to 3 times to etherify the glass surfaces to a sufficient degree to thereby obtain a glass for measuring the oriented samples.

The liquid crystal sample was placed on the glass for measuring the oriented samples at an isotropic phase temperature. The glass was set to the hot stage (FP-90) and the temperature was slowly lowered from the isotropic phase temperature to obtain the state of oriented liquid crystals. The oriented liquid crystal sample was irradiated with X-rays to obtain an orientation pattern of the liquid crystal.

The non-oriented sample was prepared as described below. The liquid crystal sample and silicon for use as a reference were held between two pieces of thin glasses in the hot stage, and were irradiated with X-rays in a state where the temperature of the hot stage was so maintained that the sample assumed the liquid crystal phase to obtain non-oriented patterns of the liquid crystal and reference silicon. A periodic length of the ordered structure seen in the liquid crystal structure was determined from the correlation of patterns of reference silicon and liquid crystal. Measurement was taken while varying the temperature to measure the periodic lengths of ordered structures of the liquid crystal phase and the crystal phase. Usually, these values are compared with the molecular length found by molecular simulation. If the length is nearly equal thereto, it is so regarded that there is no tilted structure. If the length is short, it is so regarded that there is a tilted structure. The tilted structure is decided relying also upon the observation of the texture at the time of measuring the polarization inversion current.

Since the sample of this time is a blended sample, the blending ratio is represented by the abscissa, the layer gap is represented by the ordinate, the molecular length of the blended sample only is connected by a straight line, and the presence of the tilted structure is decided relying upon if the layer gap of the liquid crystal phase is on the straight line. The layer gap of the crystal phase lies nearly on the straight line from which it is considered that the value of the crystal represents the molecular length. Therefore, it is so decided that there is no tilted structure if the layer gap is equal between the liquid crystal phase and the crystal phase, and it is so decided that there is a tilted structure if the layer gap of the liquid crystal phase is shorter than that of the crystal phase (see FIG. 4).

Figure 4:
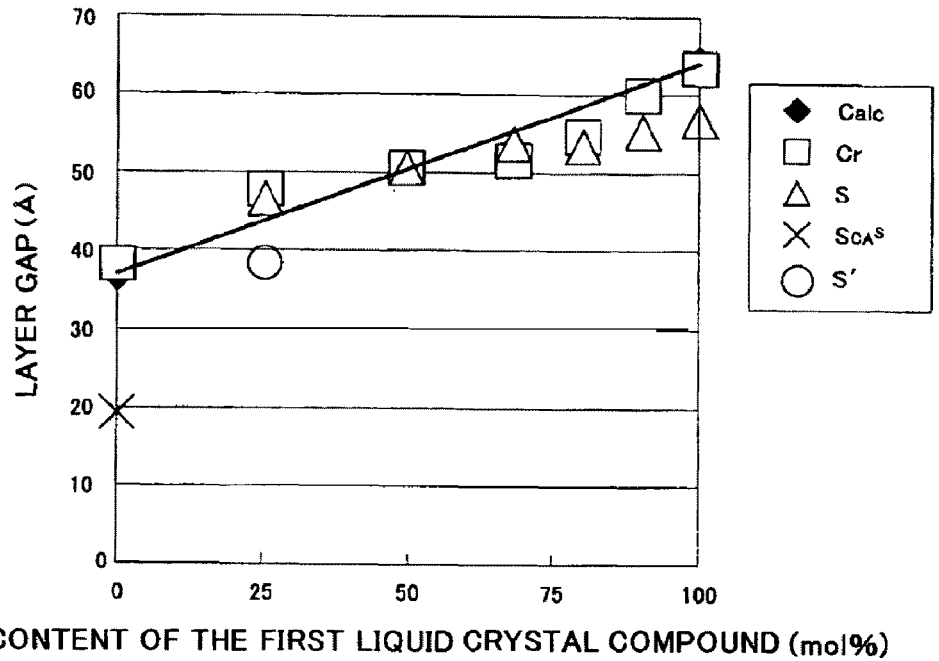
FIG. 4 is a diagram showing a change in the layer gap relative to the content of 16OAM5AMO16.

FIG. 4 is a diagram showing a change in the layer gap relative to the content of the first liquid crystal compound, wherein calc is a calculated value (of only 0% and 100% samples), Cr is a crystal phase, and S, $S_{CA}{}^s$ and S' are liquid crystal phases. $S_{CA}{}^s$ is a value one-half the molecular length.

In $S_{CA}{}^s$ as shown in FIG. 3A, each mesogen forms a layer. Referring to the formula 9, each molecule has two mesogens, and a periodic length of each mesogen is one-half the molecular length. Therefore, the gap of the smectic layer formed by $S_{CA}{}^s$ is one-half the molecular length.

It is considered that S' is modified from $S_{CA}{}^s$ due to the blending but has not been closely known yet. S' has a single-layer structure and is considered to possessing $S_A$-structure instead of $S_{CA}$-structure. Described below is a difference from $S_{CA}{}^s$ as confirmed through the measurement. First, it was confirmed that S' is monoaxial as observed by using the polarizing microscope. $S_{CA}$ is a biaxial liquid crystal. Second, the layer gap measured by using X-rays is very longer than one-half the layer gap of a blending ratio (25%) forming S' on a straight line connecting the calculated molecular lengths of the 0% and 100% samples. By taking the above two facts into account, it is considered that S' is of the single-layer structure but the mesogen is assuming an $S_A$-like structure that is not tilted relative to the normal to the layer. The $S_A$-structure is considered to have been stemming from that the bent chain and the ester portion which is a bonding group are undergoing a conformational change so that the two mesogens become in parallel. The cause of triggering the conformational change is attributed to that the bent chain and the terminal chains are held somehow between the mesogens while forming the smectic liquid crystal. In measuring the polarization inversion current, it was not confirmed that S' exhibited either ferroelectricity or antiferroelectricity.

The measured results were as shown in the column of layer gap in Table 1. For the liquid crystal phase and the crystal phase, the layer gaps are those measured by using X-rays at temperatures at which the samples exhibit their phases, and the calculated values are those of molecular lengths easily found by using a software chem3D.

Measurement of the Polarization Inversion Current (Confirmation of (Anti)Ferroelectricity).

Figure 5:
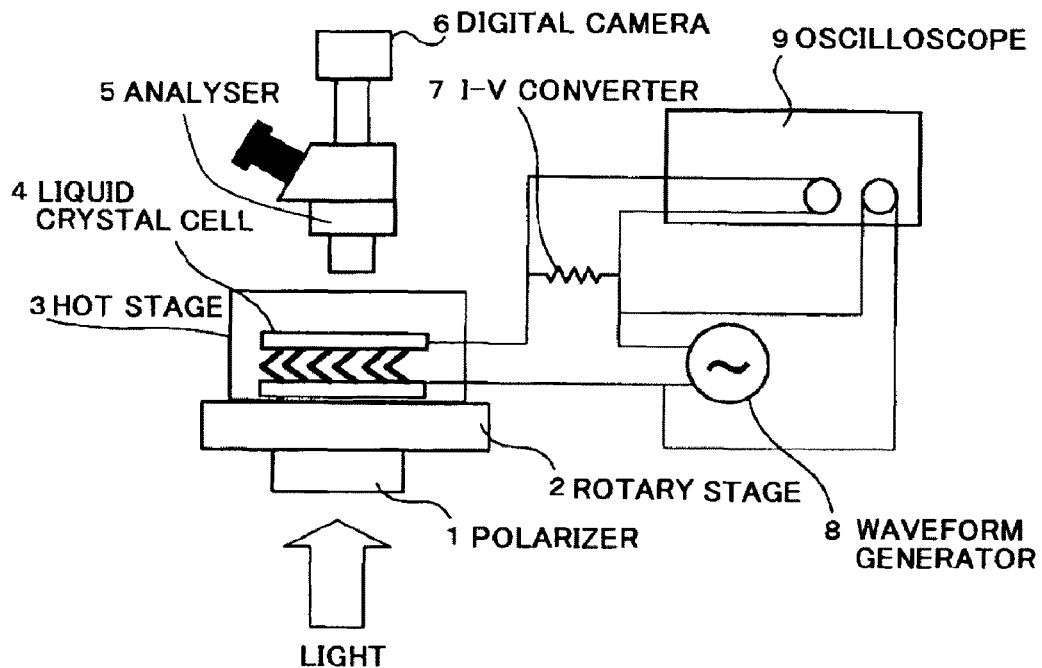
FIG. 5 is a view illustrating a device used for observing the texture of the liquid crystals, for measuring a polarization inversion current and for measuring an inversion of extinction position.
Figure 6:
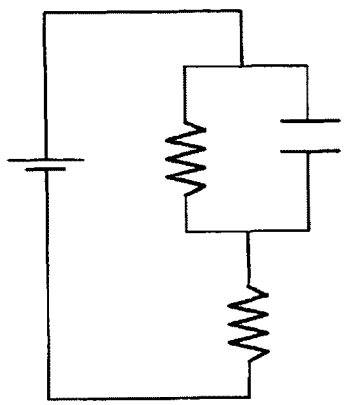
FIG. 6 is a diagram of a equivalent circuit of the device shown in FIG. 5.

Described below is the measurement of the polarization inversion current. The polarization inversion current method was employed to directly confirm the polarization in response to the electric field. FIG. 5 schematically illustrates an apparatus and FIG. 6 shows an equivalent circuit. An alternating current is applied to a liquid crystal cell 4 from a waveform generator 8, and a current flowing thereto is measured by measuring, using an oscilloscope 9 (WF1945A, manufactured by NF Co.), the potential on an I-V converter 7 which is a resistor. A triangular wave and a rectangular wave were applied as alternating electric fields. Measurement was taken by applying waves of frequencies of about 1 Hz, 5 Hz and 10 Hz of an amplitude of ±10 to 60 V.

Figure 7:
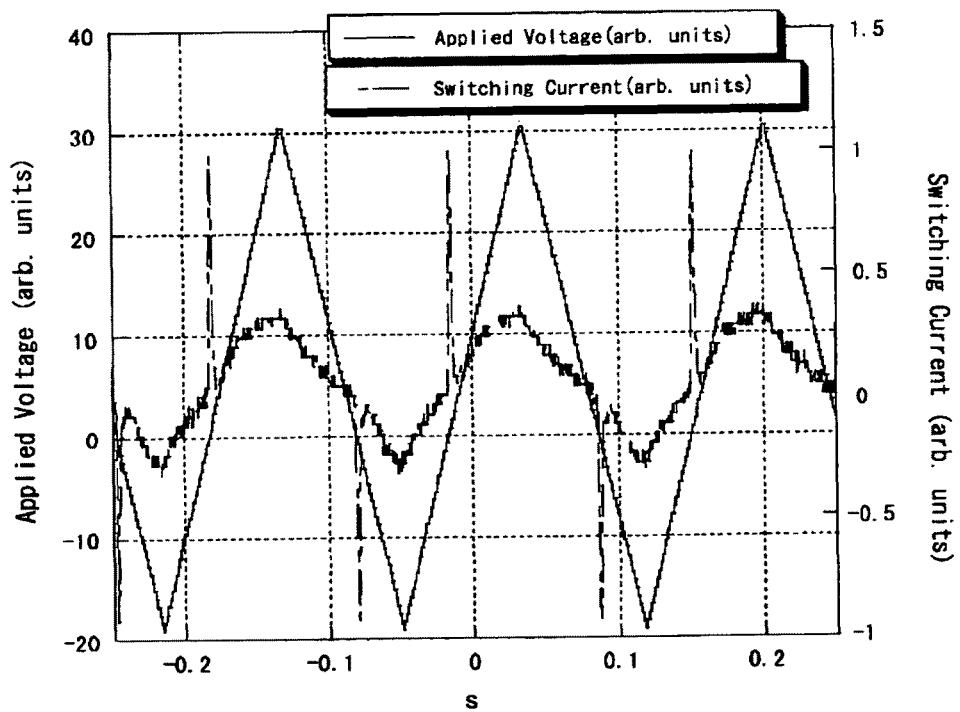
FIG. 7 is a diagram showing waveforms of when a voltage of a triangular wave is applied to the liquid crystals.

The ferroelectric or antiferroelectric liquid crystal can be decided by a waveform at the time of applying a triangular wave voltage. FIG. 7 shows waveforms exhibited by a ferroelectric liquid crystal when a triangular wave is applied thereto. As shown, the ferroelectric liquid crystal exhibits a peak for every half period. In the case of the antiferroelectric liquid crystal, the number of peaks becomes two for every half period. In the case of the paraelectric liquid crystal which is neither the ferroelectric liquid crystal nor the antiferroelectric liquid crystal, no peak is observed. The measured results were as shown in the column of the number of triangular wave peaks in Table 1. The number of triangular wave peaks is the number of peaks observed in a half period in measuring the polarization inversion current by applying a triangular wave.

Figure 8:
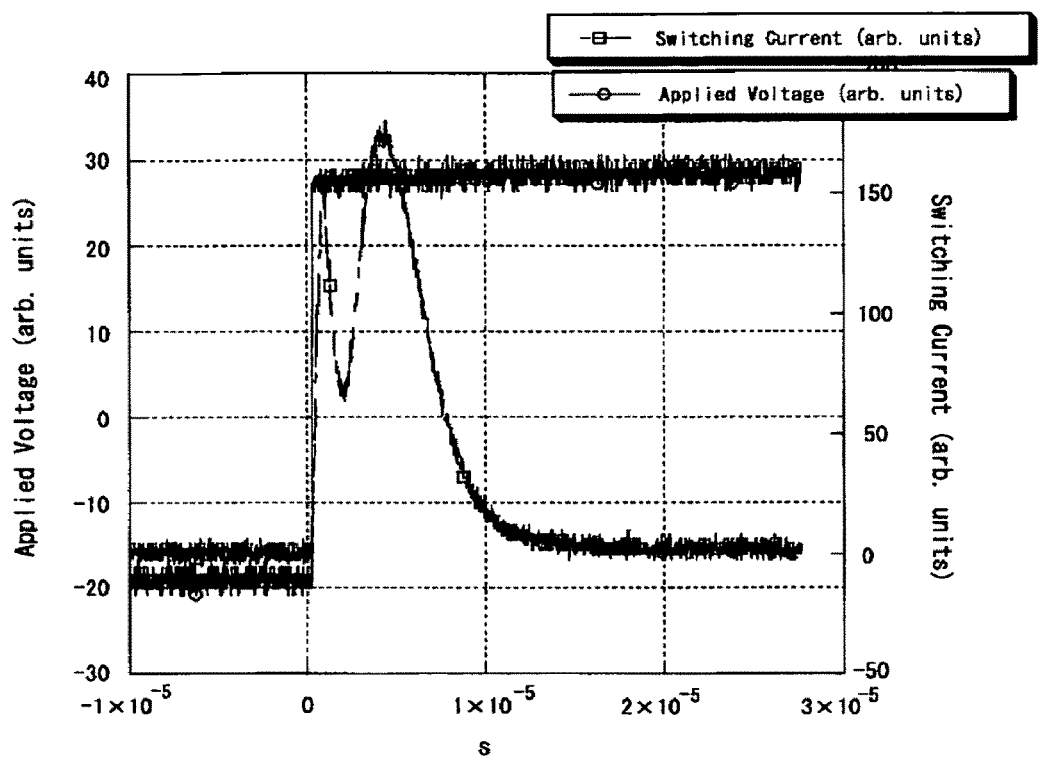
FIG. 8 is a diagram showing waveforms of when a voltage of a rectangular wave is applied to the liquid crystals.

Further, when a rectangular wave is applied to the (anti) ferroelectric liquid crystal as shown in FIG. 8, a peak that accompanies the polarization inversion is observed at a very early timing (in order of microsecond) after the inversion of the direction in which the electric field was applied. The measured results were as shown in the column of the presence of rectangular wave short-period peak in Table 1. The presence of rectangular wave short-period peak indicates if a peak was observed accompanying the inversion of spontaneous polarization in a region of microseconds after the inversion of direction in which the electric field was applied in measuring the polarization inversion current by applying the rectangular wave.

A change in the texture was observed and confirmed by using the polarizing microscope while applying an electric field. It was so decided that there was no tilted structure if there was no change in the extinction position in the liquid crystalline state between when the electric field was applied and when no electric was applied, and that there was a tilted structure if the extinction position has rotated. The measured results were as shown in the column of presence of extinction position inversion in Table 1. In some models, the extinction position does not rotate despite there is a tilted structure. Therefore, the presence of no tilted structure is decided based also upon that the layer gap in the liquid crystal phase as measured by X-rays is nearly the same as the molecular length.

The liquid crystal phase was decided by totally deciding the above results. The results of decision of the liquid crystal phase were as shown in Table 1. The results of decision of the liquid crystal phase include the decision of the presence of a tilted structure and the decision of ferroelectricity or antiferroelectricity. The presence of the tilted structure was determined by totally deciding the measured results of the layer gap and the measured results of the presence of extinction position inversion. The tilted structure was readily decided to be present when the rotation of extinction position was observed through the polarizing microscope at the time of measuring the polarization inversion current. When the rotation of extinction position was not observed, the presence of the tilted structure was roughly presumed relying upon if the layer gap in the liquid crystal phase is assuming a small value relative to a straight line connecting the calculated molecular length of the first liquid crystal compound and the second liquid crystal compound as measured by X-rays. Concretely speaking, the layer gap in the crystal phase of the blended compound is not much different from the calculated molecular length. It is, therefore, so decided that the molecules in the crystal phase do not have a tilted structure, that the liquid crystal has a tilted structure when the layer gap in the liquid crystal phase temperature zone is different from the layer gap in the crystal phase temperature zone, and that the liquid crystal has no tilted structure when the values are the same. This is because in some models, the extinction position does not rotate despite of having a tilted structure. In the Example of this time, the layer gaps of the crystal phase and the liquid crystal phase were nearly in agreement for all 0 to 80% compounds for which the rotation of extinction position was not confirmed. It was therefore so decided that no tilted structure was present based on both results.

The ferroelectricity or the antiferroelectricity was decided from the measured number of triangular wave peaks and the measured rectangular wave short-period peak. The ferroelectricity, antiferroelectricity and paraelectricity were decided as described below. That is, the ferroelectricity or antiferroelectricity was decided to be exhibited if a peak is observed in a short-period region in the measurement of a polarization inversion current by using rectangular waves, and the paraelectricity was decided to be exhibited if no peak is observed. Next, the ferroelectricity was decided to be exhibited if one peak was observed in a half period and the antifer-

TABLE 1

| Table of data | | | | | | | | | |
|---|---|---|---|---|---|---|---|---|---|
| | | | | Measured data | | | | | |
| Content of the first liquid crystal compound (mol %) | Phase transition behavior | Number of triangular wave peaks | Presence of rectangular wave short-priod peak | Layer gap | | | Presence of extinction position inversion | Decision of liquid crystal phase | |
| | | | | Liquid crystal phase (Å) | Crystal phase (Å) | Calculated value (Å) | | Presence of tilted structure | Ferroelectric or anti-ferroelectric |
| 0 | Cr73SCA$^S$143I note) | 0 | no | 19.3 | 38.4 | 36.9 | no | no | paraelectric |
| 25.1 | Cr94S103S' 113I | 1 | yes | 46.6 | 48 | — | no | no | ferroelectric |
| 49.8 | Cr95S116I | 2 | yes | 50.7 | 50.7 | — | no | no | anti-ferroelectric |
| 68.1 | Cr95S120I | 2 | yes | 53.8 | 51.6 | — | no | no | anti-ferroelectric |
| 80 | Cr108S120I | 2 | yes | 53.4 | 54.8 | — | no | no | anti-ferroelectric |
| 90 | Cr108S120I | 2 | yes | 55.4 | 60 | — | yes | yes | anti-ferroelectric |
| 100 | Cr105S122I | 2 | yes | 56.9 | 63.4 | 64.2 | yes | yes | anti-ferroelectric |

Note)
Liquid crystal phase was measured in S-phase roelectricity was decided to be exhibited if two peaks were observed in the half period in the measurement of the polarization inversion current by using triangular waves.

The invention claimed is:

1. A liquid crystal comprising a first liquid crystal compound having bent structures and another second liquid crystal compound,
   wherein a liquid crystal phase formed by the first liquid crystal compound exhibits ferroelectricity or antiferroelectricity,
   wherein a liquid crystal phase formed by the second liquid crystal compound exhibits neither ferroelectricity nor antiferroelectricity, and
   wherein the second liquid crystal compound has a bent structure.

2. The liquid crystal according to claim 1, wherein the first liquid crystal compound and the second liquid crystal compound have the same structure except the terminal chain lengths.

3. The liquid crystal according to claim 1, wherein a smectic liquid crystal phase formed by the first liquid crystal compound has a tilted structure while a smectic liquid crystal phase formed by the second liquid crystal compound has no tilted structure.

4. A liquid crystal comprising a first liquid crystal compound having bent structures and another second liquid crystal compound,
   wherein the first liquid crystal compound is represented by the following formula (m=16) and the second liquid crystal compound is represented by the following formula 1 (m=4), 5. The liquid crystal according to claim 4, wherein the content of the first liquid crystal compound is in a range of 25 to 80 mol %.

6. A liquid crystal comprising a first liquid crystal compound having bent structures and another second liquid crystal compound,
   wherein the first liquid crystal compound and the second liquid crystal compound are represented by the following general formula,

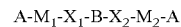

wherein A represents terminal chains, $M_1$ and $M_2$ are mesogenic groups, $X_1$ and $X_2$ are bonding groups, and B is a bent chain,
   wherein a liquid crystal phase formed by the second liquid crystal compound exhibits neither ferroelectricity nor antiferroelectricity.

7. The liquid crystal according to claim 6, wherein the mesogenic groups $M_1$ and $M_2$ as well as the bonding groups $X_1$ and $X_2$ are symmetrically arranged with the bent chain B as a center.

8. The liquid crystal according to claim 7, wherein the bent chain B is represented by either,

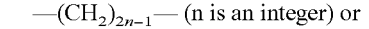  (n is an integer) or

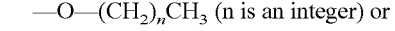  (m and n are integers), and the number of carbon atoms possessed by the bent chain B is in a range of 3 to 9.

9. The liquid crystal according to claim 7, wherein the terminal chain A is a group of either,
   —O—$(CH_2)_n CH_3$ (n is an integer) or Formula 1

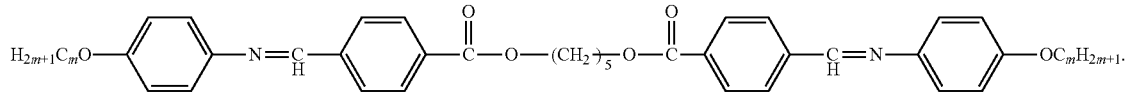

—$(CH_2)_nCH_3$ (n is an integer), the number of carbon atoms possessed by the terminal chain A of the first liquid crystal compound is in a range of 12 to 20, and the number of carbon atoms possessed by the terminal chain A of the second liquid crystal compound is in a range of 1 to 7.

10. The liquid crystal according to claim 7, wherein the mesogenic groups $M_i$ and $M_2$ are the groups of at least one kind selected from the group consisting of those of the following formula 2,

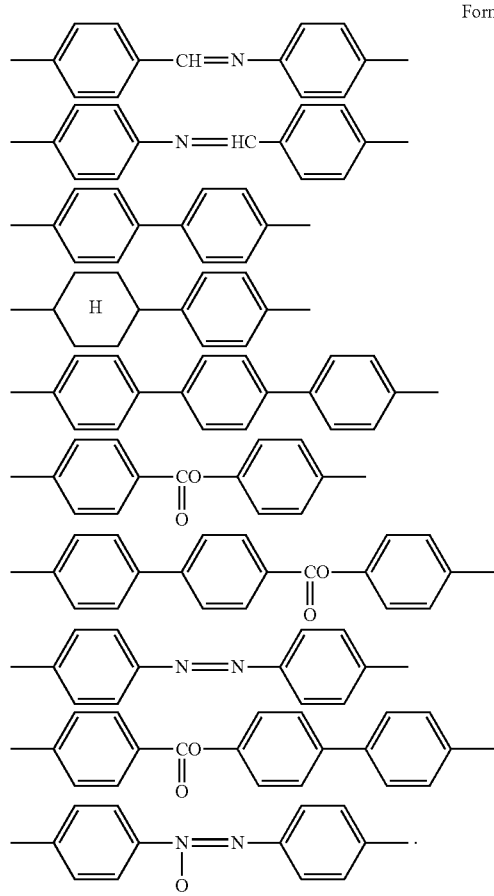

Formula 2

11. The liquid crystal according to claim 7, wherein the bonding group $X_1$ is —COO— and the bonding group $X_2$ is —OCO—.

12. A liquid crystal comprising a first liquid crystal compound having bent structures and another second liquid crystal compound, wherein the first liquid crystal compound and the second liquid crystal compound are represented by the following general formula, $A_1$-$M_1$-X-B-Y-$M_2$-$A_2$ wherein $A_1$ and $A_2$ are terminal chains, $M_1$ and $M_2$ are mesogenic groups, X and Y are bonding groups of —COO— or —OCO— independently of each other, and B is an aromatic compound group, wherein a liquid crystal phase formed by the second liquid crystal compound exhibits neither ferroelectricity nor antiferroelectricity.

13. The liquid crystal according to claim 12, wherein the terminal chains $A_1$ and $A_2$ are groups of at least one kind selected from the group consisting of, —$O(CH_2)_{n-1}CH_3$ (n is an integer), —$(CH_2)_{n-1}CH_3$ (n is an integer), —$O(CH_2CH_2O)_nCH_3$ (n is an integer), and —$O(CH_2CH_2CH_2O)_nCH_3$ (n is an integer), the number of carbon atoms possessed by the terminal chains $A_1$ and $A_2$ of the first liquid crystal compound is in a range of 12 to 20, and the number of carbon atoms possessed by the terminal chains $A_1$ and $A_2$ of the second liquid crystal compound is in a range of 1 to 7.

14. The liquid crystal according to claim 12, wherein the mesogenic groups $M_1$ and $M_2$ are the groups of at least one kind selected from the group consisting of those of the formula 3,

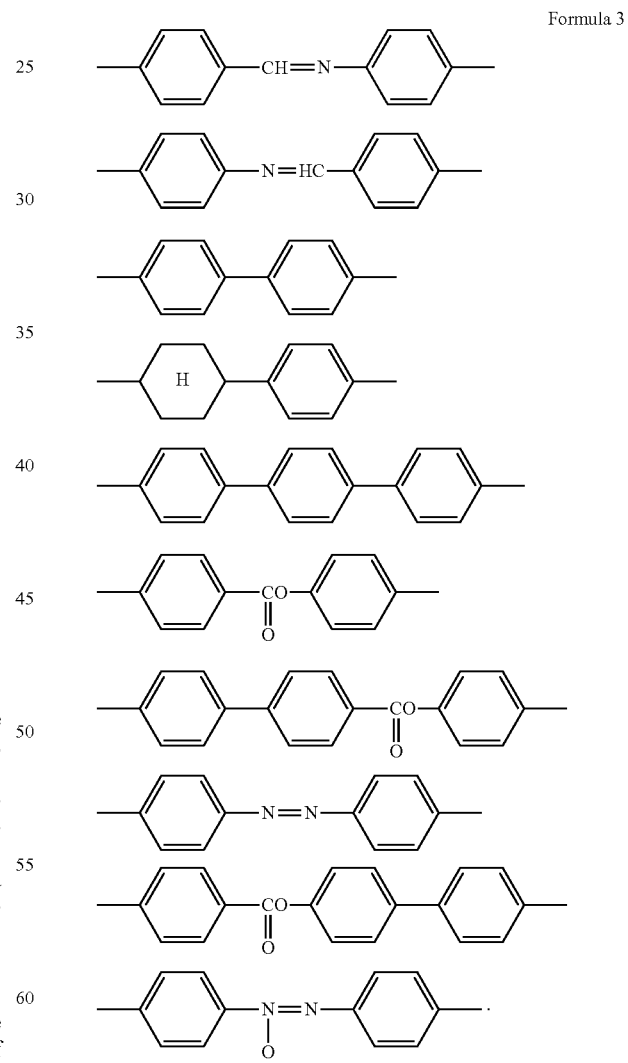

Formula 3

15. The liquid crystal according to claim 12, wherein the aromatic compound group B is a group of at least one kind selected from the group consisting of those of the formula 4, Formula 4

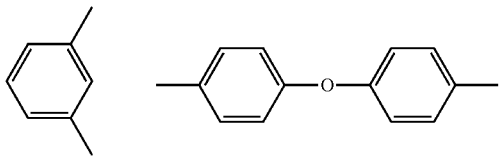

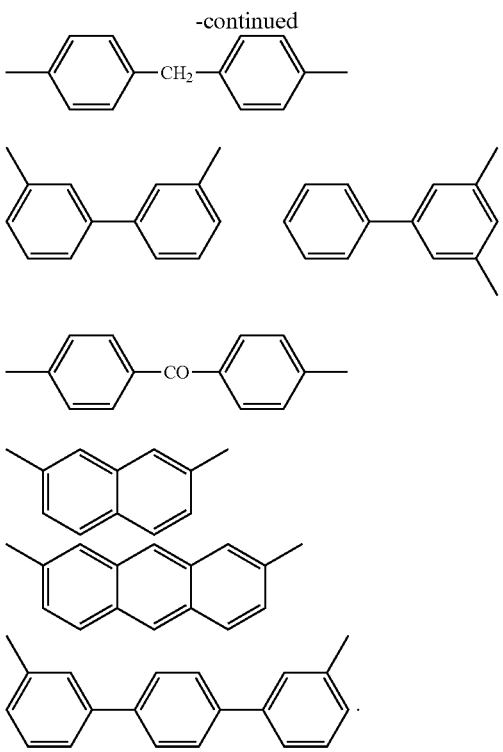

-continued

16. A liquid crystal display using liquid crystals comprising a first liquid crystal compound having bent structures and another second liquid crystal compound,
   wherein a liquid crystal phase formed by the first liquid crystal compound exhibits ferroelectricity or antiferroelectricity,
   wherein the liquid crystal phase formed by the second liquid crystal compound exhibits neither ferroelectricity nor antiferroelectricity, and
   wherein the second liquid crystal compound has a bent structure.

17. The liquid crystal display according to claim 16, wherein the first liquid crystal compound and the second liquid crystal compound have the same structure except the terminal chain lengths.

18. The liquid crystal display according to claim 16, wherein a smectic liquid crystal phase formed by the first liquid crystal compound has a tilted structure while a smectic liquid crystal phase formed by the second liquid crystal compound has no tilted structure.

19. A liquid crystal display using liquid crystals comprising a first liquid crystal compound having bent structures and another second liquid crystal compound,
   wherein the first liquid crystal compound is represented by the formula 5 (m=16) and the second liquid crystal compound is represented by the formula 5 (m=4), Formula 5

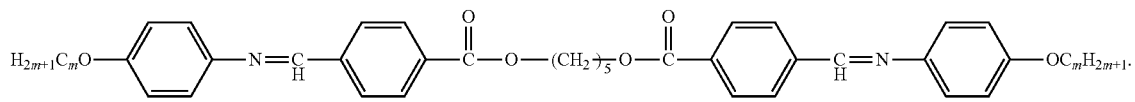

20. The liquid crystal display according to claim 19, wherein the content of the first liquid crystal compound is in a range of 25 to 80 mol %.

21. A liquid crystal display using liquid crystals comprising a first liquid crystal compound having bent structures and another second liquid crystal compound,
   wherein the first liquid crystal compound and the second liquid crystal compound are represented by the following general formula, $A-M_1-X_1-B-X_2-M_2-A$ wherein A represents terminal chains, $M_1$ and $M_2$ are mesogenic groups, $X_1$ and $X_2$ are bonding groups, and B is bent chain
   wherein the liquid crystal phase formed by the second liquid crystal compound exhibits neither ferroelectricity nor antiferroelectricity.

22. The liquid crystal display according to claim 21, wherein the mesogenic groups $M_1$ and $M_2$ as well as the bonding groups $X_1$ and $X_2$ are symmetrically arranged with the bent chain B as a center.

23. The liquid crystal display according to claim 22, wherein the bent chain B is represented by either,
   —$(CH_2)_{2n-1}$— (n is an integer) or
   —$(CH_2)_m$—O—$)_{2n-1}$—$(CH_2)_m$— (m and n are integers), and
   the number of carbon atoms possessed by the bent chain B is in a range of 3 to 9.

24. The liquid crystal display according to claim 22, wherein the terminal chain A is a group of either,
   —O—$(CH_2)_n CH_3$ (n is an integer) or
   —$(CH_2)_n CH_3$ (n is an integer),
   the number of carbon atoms possessed by the terminal chain A of the first liquid crystal compound is in a range of 12 to 20, and
   the number of carbon atoms possessed by the terminal chain A of the second liquid crystal compound is in a range of 1 to 7.

25. The liquid crystal display according to claim 22, wherein the mesogenic groups $M_1$ and $M_2$ are the groups of at least one kind selected from the group consisting of those of the formula 6, Formula 6

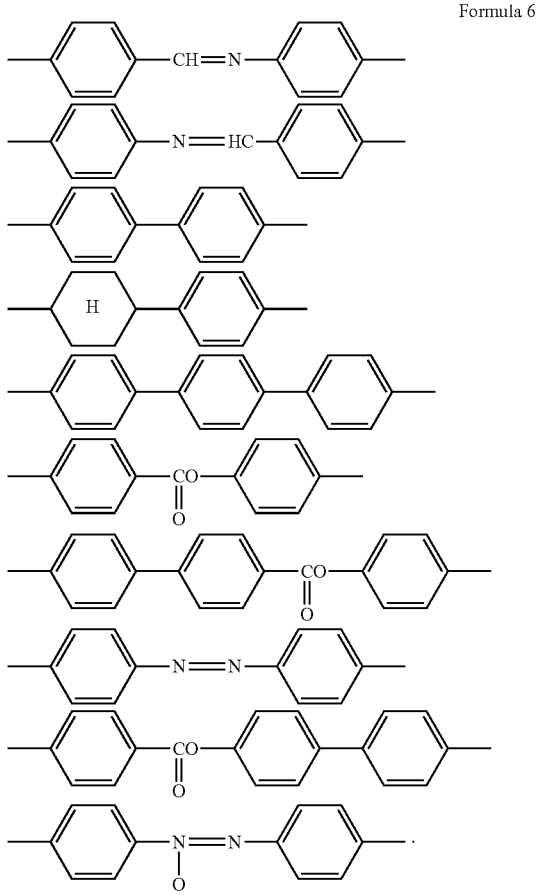

26. The liquid crystal display according to claim 22, wherein the bonding group $X_1$ is —COO— and the bonding group $X_2$ is —OCO—.

27. A liquid crystal display using liquid crystals comprising a first liquid crystal compound having bent structures and another second liquid crystal compound,
wherein the first liquid crystal compound and the second liquid crystal compound are represented by the general formula,

A-$M_1$-X-B-Y-$M_2$-$A_2$ wherein $A_1$ and $A_2$ are terminal chains, $M_1$ and $M_2$ are mesogenic groups, X and Y are bonding groups of —COO— or —OCO— independently of each other, and B is an aromatic compound group,
wherein a liquid crystal phase formed by the second liquid crystal compound exhibits neither ferroelectricity nor antiferroelectricity.

28. The liquid crystal display according to claim 27, wherein the terminal chains $A_1$ and $A_2$ are groups of at least one kind selected from the group consisting of,
—O($CH_2$)$_{n-1}$$CH_3$ (n is an integer),
—($CH_2$)$_{n-1}$$CH_3$ (n is an integer),
—O($CH_2CH_2O$)$_n$$CH_3$ (n is an integer), and
—O($CH_2CH_2CH_2O$)$_n$$CH_3$ (n is an integer),
the number of carbon atoms possessed by the terminal chains $A_1$ and $A_2$ of the first liquid crystal compound is in a range of 12 to 20, and
the number of carbon atoms possessed by the terminal chains $A_1$ and $A_2$ of the second liquid crystal compound is in a range of 1 to 7.

29. The liquid crystal display according to claim 27, wherein the mesogenic groups $M_1$ and $M_2$ are the groups of at least one kind selected from the group consisting of those of the formula 7, Formula 7

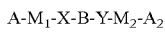

30. The liquid crystal display according to claim 27, wherein the aromatic compound group B is a group of at least one kind selected from the group consisting of those of the formula 8, Formula 8

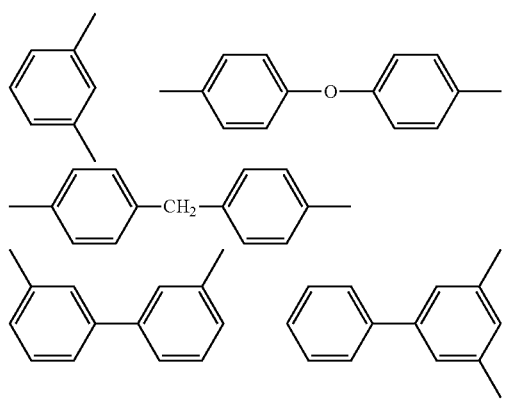

-continued

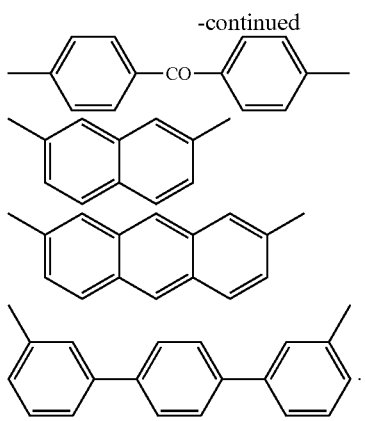

31. A liquid crystal comprising a first liquid crystal compound and a second liquid crystal compound,
wherein the first liquid crystal compound is represented by one of the two following general formulas, and the second liquid crystal compound is represented by another of the following general formulas, $A\text{-}M_1\text{-}X_1\text{-}B\text{-}X_2\text{-}M_2\text{-}A$ wherein A represents terminal chains, $M_1$ and $M_2$ are mesogenic groups, $X_1$ and $X_2$ are bonding groups, and B is a bent chain, $A_1\text{-}M_1\text{-}X\text{-}B\text{-}Y\text{-}M_2\text{-}A_2$ wherein $A_1$ and $A_2$ are terminal chains, $M_1$ and $M_2$ are mesogenic groups, X and Y are bonding groups, and B is an aromatic compound group,
wherein a liquid crystal phase formed by the second liquid crystal compound exhibits neither ferroelectricity nor antiferroelectricity.

32. A liquid crystal display using liquid crystals comprising a first liquid crystal compound and another second liquid crystal compound,
wherein the first liquid crystal compound is represented by one of the two following general formulas, and the second liquid crystal compound is represented by another of the following general formulas, $A\text{-}M_1\text{-}X_1\text{-}B\text{-}X_2\text{-}M_2\text{-}A$ wherein A represents terminal chains, $M_1$ and $M_2$ are mesogenic groups, $X_1$ and $X_2$ are bonding groups, and B is a bent chain, $A_1\text{-}M_1\text{-}X\text{-}B\text{-}Y\text{-}M_2\text{-}A_2$ wherein $A_1$ and $A_2$ are terminal chains, $M_1$ and $M_2$ are mesogenic groups, X and Y are bonding groups, and B is an aromatic compound group,
wherein a liquid crystal phase formed by the second liquid crystal compound exhibits neither ferroelectricity nor antiferroelectricity.

* * * * *